(12) United States Patent
Lee et al.

(10) Patent No.: US 10,217,436 B2
(45) Date of Patent: Feb. 26, 2019

(54) DISPLAY PANEL HAVING A REDUCED NUMBER OF DATA LINES AND A REDUCED NUMBER OF CHANNELS FOR A DRIVER

(71) Applicant: Samsung Display Co., Ltd., Yongin, Gyeonggi-Do (KR)

(72) Inventors: Junpyo Lee, Asan-si (KR); ByungKil Jeon, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 119 days.

(21) Appl. No.: 14/819,327

(22) Filed: Aug. 5, 2015

(65) Prior Publication Data

US 2016/0203789 A1 Jul. 14, 2016

(30) Foreign Application Priority Data

Jan. 12, 2015 (KR) .................. 10-2015-0004131

(51) Int. Cl.
G09G 3/36 (2006.01)
G09G 5/02 (2006.01)
G02F 1/1335 (2006.01)
G02F 1/1343 (2006.01)

(52) U.S. Cl.
CPC ......... *G09G 5/02* (2013.01); *G02F 1/133514* (2013.01); *G02F 1/134309* (2013.01); *G09G 3/3648* (2013.01); *G02F 2001/134354* (2013.01); *G09G 2300/0452* (2013.01); *G09G 2300/0804* (2013.01); *G09G 2310/0251* (2013.01); *G09G 2310/0262* (2013.01)

(58) Field of Classification Search
CPC ............................................. G09G 2300/0452
See application file for complete search history.

(56) References Cited

U.S. PATENT DOCUMENTS

| | | | |
|---|---|---|---|
| 6,518,941 B1 * | 2/2003 | Kimura | G09G 3/2074 315/169.3 |
| 7,705,924 B2 * | 4/2010 | Kim | G09G 3/006 324/760.01 |
| 7,746,335 B2 * | 6/2010 | Hsu | G09G 3/3614 345/209 |
| 8,169,389 B2 * | 5/2012 | Cok | H04N 9/67 345/591 |
| 8,169,391 B2 | 5/2012 | Lee et al. | |
| 8,416,168 B2 * | 4/2013 | Cho | G09G 3/3607 345/90 |
| 8,803,415 B2 * | 8/2014 | Lee | H01L 51/5259 313/501 |
| 8,804,082 B2 * | 8/2014 | Lee | G02F 1/134309 349/143 |

(Continued)

FOREIGN PATENT DOCUMENTS

KR 10-0589785 B1 6/2006
KR 10-2008-0112855 A 12/2008

(Continued)

*Primary Examiner* — Chad M Dicke
(74) *Attorney, Agent, or Firm* — Innovation Counsel LLP

(57) ABSTRACT

A display panel includes a plurality of pixels. Each pixel includes a plurality of different-color sub-pixels and a coupling sub-pixel that overlaps at least one color sub-pixel so as to be configured to be capacitively coupled to the at least one color sub-pixel to be thereby driven so as to display a color different from that of the different-color sub-pixels.

10 Claims, 12 Drawing Sheets

(56) References Cited

U.S. PATENT DOCUMENTS

| | | | |
|---|---|---|---|
| 9,287,333 B2* | 3/2016 | Jinta | H01L 27/3218 |
| 9,291,868 B2* | 3/2016 | Lee | G02F 1/136286 |
| 9,341,903 B2* | 5/2016 | Nakano | G02F 1/136213 |
| 9,417,487 B2* | 8/2016 | Hwang | G02F 1/134309 |
| 9,418,580 B2* | 8/2016 | Kim | G09G 3/003 |
| 2004/0065902 A1* | 4/2004 | Yamazaki | H01L 27/3244 |
| | | | 257/200 |
| 2004/0239658 A1* | 12/2004 | Koyama | G09G 3/32 |
| | | | 345/204 |
| 2004/0252085 A1* | 12/2004 | Miyagawa | G09G 3/3233 |
| | | | 345/76 |
| 2004/0263499 A1* | 12/2004 | Tanada | G09G 3/30 |
| | | | 345/204 |
| 2005/0036091 A1* | 2/2005 | Song | G02F 1/133707 |
| | | | 349/129 |
| 2006/0187155 A1* | 8/2006 | Chang | G09G 3/3208 |
| | | | 345/76 |
| 2006/0215066 A1* | 9/2006 | Ueda | G02F 1/134309 |
| | | | 349/38 |
| 2007/0063192 A1* | 3/2007 | Peng | G09G 3/3225 |
| | | | 257/40 |
| 2007/0064164 A1* | 3/2007 | Tasaka | G02F 1/136213 |
| | | | 349/38 |
| 2007/0108443 A1* | 5/2007 | Kim | H01L 27/3202 |
| | | | 257/40 |
| 2008/0198290 A1* | 8/2008 | Su | G02F 1/13624 |
| | | | 349/48 |
| 2008/0284929 A1* | 11/2008 | Kimura | G02F 1/13624 |
| | | | 349/38 |
| 2009/0009449 A1* | 1/2009 | Uchida | G02F 1/13624 |
| | | | 345/87 |
| 2009/0009458 A1* | 1/2009 | Bae | G09G 3/3607 |
| | | | 345/92 |
| 2011/0025923 A1* | 2/2011 | Tsubata | G02F 1/136213 |
| | | | 348/731 |
| 2011/0085099 A1* | 4/2011 | Kim | G02F 1/133707 |
| | | | 349/39 |
| 2012/0268357 A1* | 10/2012 | Shih | G09G 3/3607 |
| | | | 345/88 |
| 2013/0002625 A1* | 1/2013 | Liao | G02F 1/134309 |
| | | | 345/205 |
| 2013/0201166 A1* | 8/2013 | Wang | G09G 3/18 |
| | | | 345/204 |
| 2014/0043554 A1* | 2/2014 | No | G02F 1/136227 |
| | | | 349/43 |
| 2015/0042939 A1* | 2/2015 | Park | G02F 1/134336 |
| | | | 349/144 |
| 2015/0062150 A1* | 3/2015 | Small | G09G 3/2011 |
| | | | 345/599 |
| 2015/0103063 A1* | 4/2015 | Ye | G09G 3/3648 |
| | | | 345/212 |
| 2016/0335937 A1* | 11/2016 | Lee | G09G 3/2003 |
| 2016/0351137 A1* | 12/2016 | Lee | G09G 3/3611 |

FOREIGN PATENT DOCUMENTS

| | | |
|---|---|---|
| KR | 10-1279120 B1 | 6/2013 |
| KR | 10-1296904 B1 | 8/2013 |
| KR | 10-1296909 B1 | 8/2013 |

* cited by examiner

DISPLAY PANEL HAVING A REDUCED NUMBER OF DATA LINES AND A REDUCED NUMBER OF CHANNELS FOR A DRIVER

CROSS-REFERENCE TO RELATED APPLICATION

This U.S. non-provisional patent application claims priority under 35 U.S.C. § 119 to Korean Patent Application No. 10-2015-0004131 filed on Jan. 12, 2015, the entire contents of which are hereby incorporated by reference.

BACKGROUND

1. Field of Disclosure

Embodiments of the present disclosure relate generally to flat panel displays. More particularly, embodiments of the present disclosure relate to display panels having fewer data lines and fewer driver channels.

2. Description of the Related Art

In general, a display device displays colors by combining the three primary colors red, green, and blue. Thus, a display panel applied to a conventional display device includes a red pixel, a green pixel, and a blue pixel, which respectively display red, green, and blue colors.

Some recent display devices have added another color to their red, green, and blue colors. This additional color is often one of magenta, cyan, yellow, and white, or a combination of two or more of magenta, cyan, yellow, and white. In particular, in order to improve the brightness of an image displayed through the display panel, a display device including red, green, blue, and white sub-pixels has been developed. This display device receives red, green, and blue image signals and converts the red, green, and blue image signals to red, green, blue, and white data signals.

The converted red, green, blue, and white data signals are respectively applied to the red, green, blue, and white sub-pixels. Thus, the image is displayed by the red, green, blue, and white sub-pixels.

SUMMARY

Embodiments of the present disclosure provide a display panel having a reduced number of data lines and a reduced number of channels for a driver.

Embodiments of the inventive concept provide a display panel including a plurality of pixels. Each pixel includes a plurality of different-color sub-pixels and a coupling sub-pixel that overlaps at least one color sub-pixel so as to be configured to be capacitively coupled to the at least one color sub-pixel to be thereby driven so as to display a color different from the colors of the different-color sub-pixels.

Additional features and aspects include any one or more of the following.

The at least one color sub-pixel includes a color pixel electrode and a pixel transistor, the coupling sub-pixel includes a coupling pixel electrode, and a drain electrode of the pixel transistor makes contact with the color pixel electrode, is insulated from the coupling pixel electrode, and overlaps at least a portion of the coupling pixel electrode.

The display panel further includes an initialization transistor that is configured to apply an initialization voltage to the coupling pixel electrode in response to an initialization control signal so as to initialize the coupling sub-pixel.

The initialization control signal is a k-th gate signal, and the pixel transistor is turned on in response to an i-th gate signal, where i is a natural number, and k is a natural number smaller than i.

The display panel further includes an i-th gate line arranged at an i-th row and a k-th gate line arranged at a k-th row. The initialization transistor is connected to the k-th gate line to receive the k-th gate signal from the k-th gate line, and the pixel transistor is connected to the i-th gate line to receive the i-th gate signal from the i-th gate signal.

The display panel further includes an initialization line that is insulated from the i-th gate line and the k-th gate line and that is configured to receive the initialization voltage. The initialization transistor includes a gate electrode connected to the k-th gate line, a source electrode connected to the initialization line, and a drain electrode connected to the coupling pixel electrode.

The pixel transistor includes a source electrode connected to the i-th gate line and a drain electrode connected to the color pixel electrode, where the color pixel electrode overlaps the coupling pixel electrode, while also being insulated from the coupling pixel electrode.

The initialization line is disposed in a same layer in which a gate electrode of the pixel transistor and a gate electrode of the coupling transistor are disposed.

The coupling pixel electrode is disposed in a same layer in which the color pixel electrode is disposed.

The at least one color sub-pixel includes a first color sub-pixel and a second color sub-pixel, the first color sub-pixel is capacitively coupled to the coupling sub-pixel to form a first capacitance between the first color sub-pixel and the coupling sub-pixel, the second color sub-pixel is capacitively coupled to the coupling sub-pixel to form a second capacitance between the second color sub-pixel and the coupling sub-pixel, and the first capacitance is greater than the second capacitance.

The at least one color sub-pixel further includes a third color sub-pixel, the third color sub-pixel is capacitively coupled to the coupling sub-pixel to form a third capacitance between the third color sub-pixel and the coupling sub-pixel, and the third capacitance is smaller than the second capacitance.

A first area in which a first drain electrode of a first pixel transistor of the first color sub-pixel overlaps the coupling pixel electrode is greater than a second area in which a second drain electrode of a second pixel transistor of the second color sub-pixel overlaps the coupling pixel electrode.

A third area, in which a third drain electrode of a third pixel transistor of the third color sub-pixel overlaps the coupling pixel electrode, is smaller than the second area.

The first color sub-pixel is a green sub-pixel configured to display a green color and the coupling sub-pixel is a white sub-pixel configured to display a white color.

The second color sub-pixel is a red sub-pixel configured to display a red color and the third color sub-pixel is a blue sub-pixel configured to display a blue color.

The at least one color sub-pixel includes a color high sub-pixel and a color low sub-pixel configured to display an image having a brightness lower than a brightness of an image displayed by the color high sub-pixel, and the coupling sub-pixel overlaps the color low sub-pixel to be capacitively coupled to the color low sub-pixel.

The color low sub-pixel includes a first transistor configured to receive a data voltage and a second transistor configured to receive a down voltage to divide the data voltage.

The first transistor includes a source electrode configured to receive the data voltage, a gate electrode configured to receive a gate signal, and a drain electrode. The second transistor includes a drain electrode connected to the drain electrode of the first transistor, a gate electrode configured to receive the gate signal, and a source electrode configured to receive the down voltage.

The at least one color sub-pixel includes a color pixel electrode and the coupling sub-pixel includes a coupling pixel electrode. The drain electrodes of the first and second transistors contact the color pixel electrode, are insulated from the coupling pixel electrode, and overlap at least a portion of the coupling pixel electrode.

The display panel further includes a common electrode facing the color pixel electrode and the coupling pixel electrode.

The coupling sub-pixel is electrically separated from a data line.

The coupling sub-pixel includes the coupling pixel electrode, and the at least one color sub-pixel includes a color pixel electrode overlapping at least a portion of the coupling pixel electrode.

The display panel further includes an insulating layer interposed between the coupling pixel electrode and the color pixel electrode.

According to the above, the white sub-pixel is capacitively coupled to one or more other-colored sub-pixels, and thus the display panel does not require a separate data line for the white sub-pixel. Thus, the number of data lines included in the display panel and the number of channels for the driver are reduced and power consumption in the display panel is also reduced.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
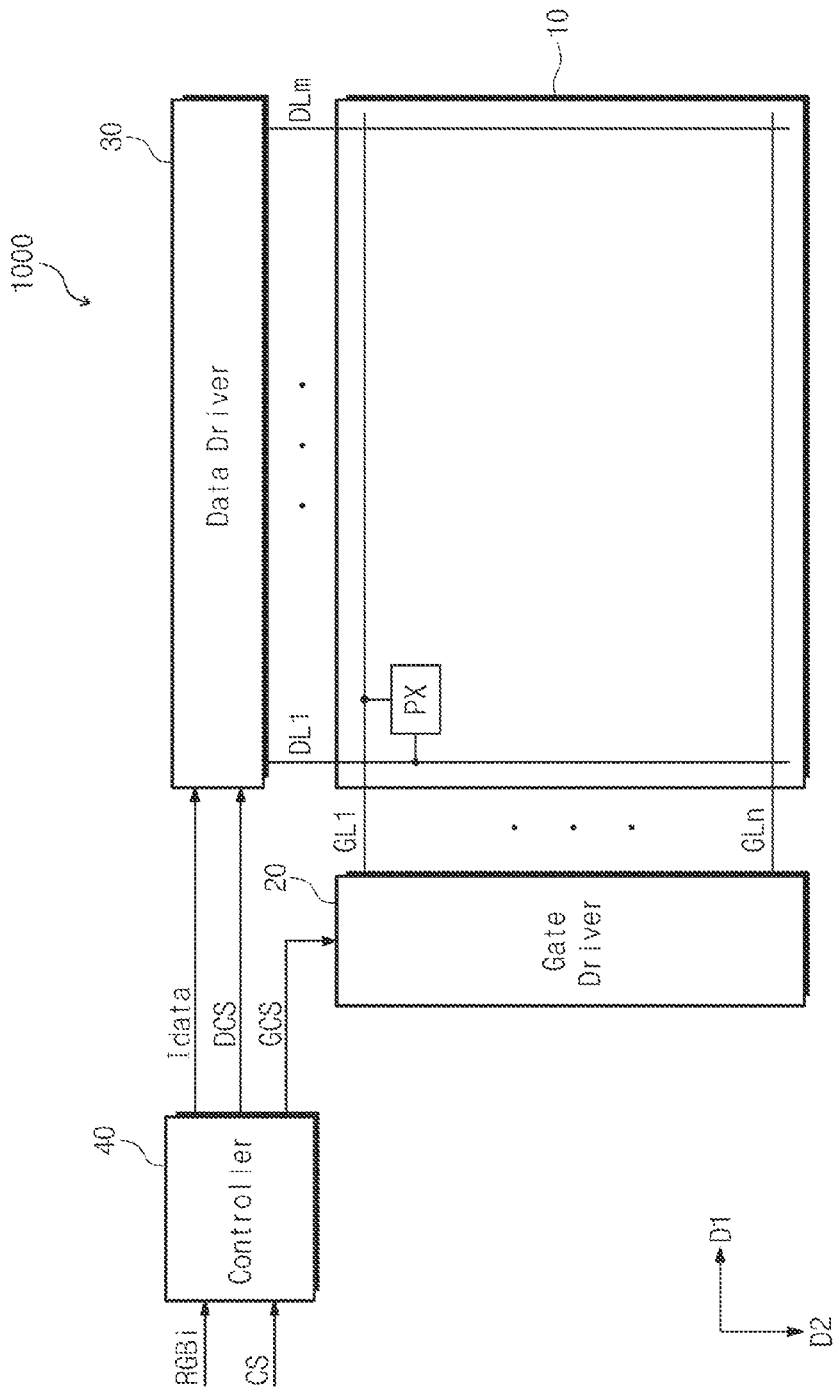
FIG. 1 is a block diagram illustrating a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings, which are not to scale. All numerical values are approximate and may vary.

FIG. 1 is a block diagram showing a display device 1000 according to an exemplary embodiment of the present disclosure.

Referring to FIG. 1, the display device 1000 includes a display panel 10 displaying an image, a gate driver 20 and a data driver 30 which together drive the display panel 10, and a controller 40 controlling an operation of the gate driver 20 and the data driver 30.

The controller 40 receives an input image information RGBi and a plurality of control signals CS from a source external to the display device 1000. The controller 40 converts a data format of the input image information RGBi to a data format appropriate to an interface between the data driver 30 and the controller 40 and to the specifications of the display panel 10, to generate image data Idata. It then applies the image data Idata to the data driver 30.

In addition, the controller 40 generates a data control signal DCS, e.g., an output start signal, a horizontal start signal, etc., and a gate control signal GCS, e.g., a vertical start signal, a vertical clock signal, a vertical clock bar signal, etc., on the basis of the control signals CS. The data control signal DCS is applied to the data driver 30 and the gate control signal GCS is applied to the gate driver 20.

The gate driver 20 sequentially outputs gate signals in response to the gate control signal GCS provided from the controller 40.

The data driver 30 converts the image data Idata to data voltages in response to the data control signal DCS provided from the controller 40, and applies the data voltages to the display panel 10.

The display panel 10 includes a plurality of gate lines GL1 to GLn, a plurality of data lines DL1 to DLm, and a plurality of pixels PX.

Each pixel PX serves as a basic element displaying a unit of an image. The display panel 10 has a resolution determined by the number of pixels PX arranged thereon. For the convenience of explanation, FIG. 1 shows only one pixel PX, and thus details of the other pixels will be omitted.

The gate lines GL1 to GLn extend substantially in a first direction D1 and are arranged to be laid out side by side and parallel to each other along a second direction D2 that is substantially perpendicular to the first direction D1. The gate lines GL1 to GLn are connected to the gate driver 20 to sequentially receive the gate signals from the gate driver 20.

The data lines DL1 to DLm extend substantially in the second direction D2 and are arranged to be laid out side by side and parallel to each other along the first direction D1. The data lines DL1 to DLm are connected to the data driver 30 to receive the data voltages from the data driver 30.

The controller 40 is mounted on a printed circuit board in an integrated circuit chip form and connected to the gate driver 20 and the data driver 30. The gate driver 20 and the data driver 30 are mounted on a flexible printed circuit board after being formed in, for example, plural driving chips, and then connected to the display panel 10 in a tape carrier package (TCP) scheme.

However, embodiments of the invention should not be limited thereto or thereby. Any other configurations are contemplated. For example, the gate driver 20 and the data driver 30 may be mounted on the display panel 10 in a chip on glass (COG) scheme after being form in plural driving chips. In addition, the gate driver 20 may be substantially simultaneously formed with transistors of the pixels PX and mounted on the display panel 10 in an amorphous silicon TFT gate driver circuit (ASG) form.

In the present exemplary embodiment, a liquid crystal display panel will be described as the display panel 10. However, the form of display panel 10 should not be considered as being limited to liquid crystal display panels. That is, the display panel 10 may instead be an organic light emitting display panel, a plasma display panel, an electrophoretic display panel, an electrowetting display panel, etc.

Figure 2:
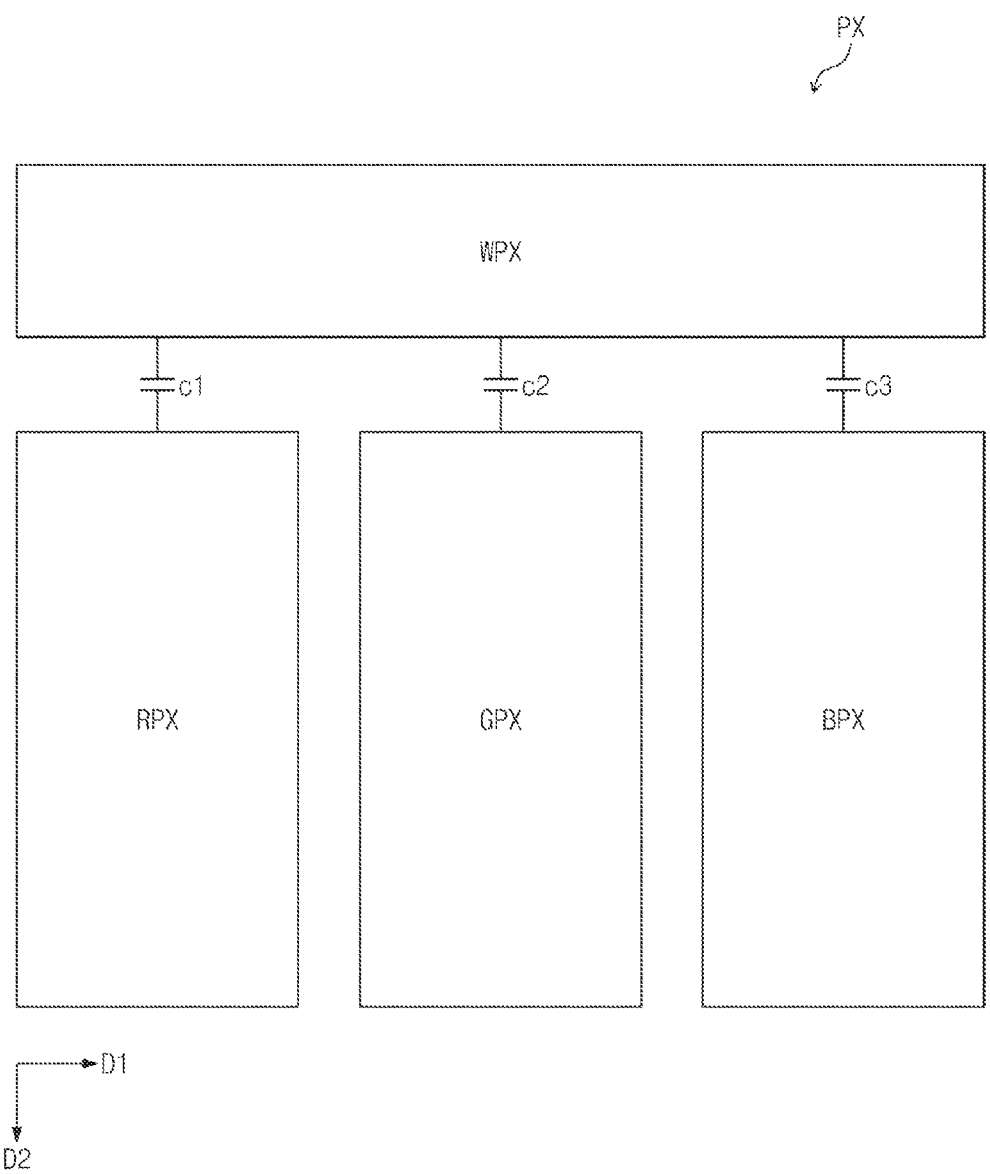
FIG. 2 is a plan view of a pixel shown in FIG. 1.

FIG. 2 is a plan view showing the pixel shown in FIG. 1. Referring to FIG. 2, the pixel PX includes a plurality of sub-pixels displaying different colors. The sub-pixels each display one primary color. The primary colors may include, but are not limited to, a red color, a green color, a blue color, and a white color. Alternatively, the primary colors may further include various other colors, e.g., yellow, cyan, magenta, etc.

The pixel PX includes a red sub-pixel RPX, a green sub-pixel GPX, a blue sub-pixel BPX, and a white sub-pixel WPX, which display red, green, blue, and white colors, respectively. The white sub-pixel WPX is arranged in a first row. The red, green, and blue sub-pixels RPX, GPX, and BPX are sequentially arranged in a second row which is disposed adjacent to the first row in the second direction D2.

The white sub-pixel WPX has long sides oriented substantially parallel to the first direction D1 and the red, green, and blue sub-pixels RPX, GPX, and BPX have long sides oriented substantially parallel to the second direction D2. The long sides of the white sub-pixel WPX are longer than the short sides of the red, green, and blue sub-pixels RPX, GPX, and BPX. For instance, the long sides of the white sub-pixel WPX are about two or three times longer than the short sides of the red, green, and blue sub-pixels RPX, GPX, and BPX. In FIG. 2 for example, the long sides of the white sub-pixel WPX are shown as being about three times longer than the short sides of sub-pixels RPX, GPX, and BPX.

Since the white sub-pixel WPX displays a white color, a brightness of the pixel PX is improved.

The white sub-pixel WPX overlaps the red, green, and blue sub-pixels RPX, GPX, and BPX to be capacitively coupled to the red, green, and blue sub-pixels RPX, GPX, and BPX. The white sub-pixel WPX may thus be referred to as a coupling sub-pixel.

A first capacitance c1 is formed between the white sub-pixel WPX and the red sub-pixel RPX, a second capacitance c2 is formed between the white sub-pixel WPX and the green sub-pixel GPX, and a third capacitance c3 is formed between the white sub-pixel WPX and the blue sub-pixel BPX. The first, second, and third capacitances c1, c2, and c3 have different values from each other.

As described above, the white sub-pixel WPX is coupled to the red, green, and blue sub-pixels RPX, GPX, and BPX to be dependently driven. Thus, a separate data line required to drive the white sub-pixel WPX, a driving circuit of the data driver 30 (refer to FIG. 1) required to generate the data voltage applied to the white sub-pixel WPX, and a white driving algorithm implemented by the controller 40 are unnecessary. As a result, structures of the display panel 10, the data driver 30, and the controller 40 are simplified. In addition, a power consumption of the display device 1000 is reduced.

Figure 3:
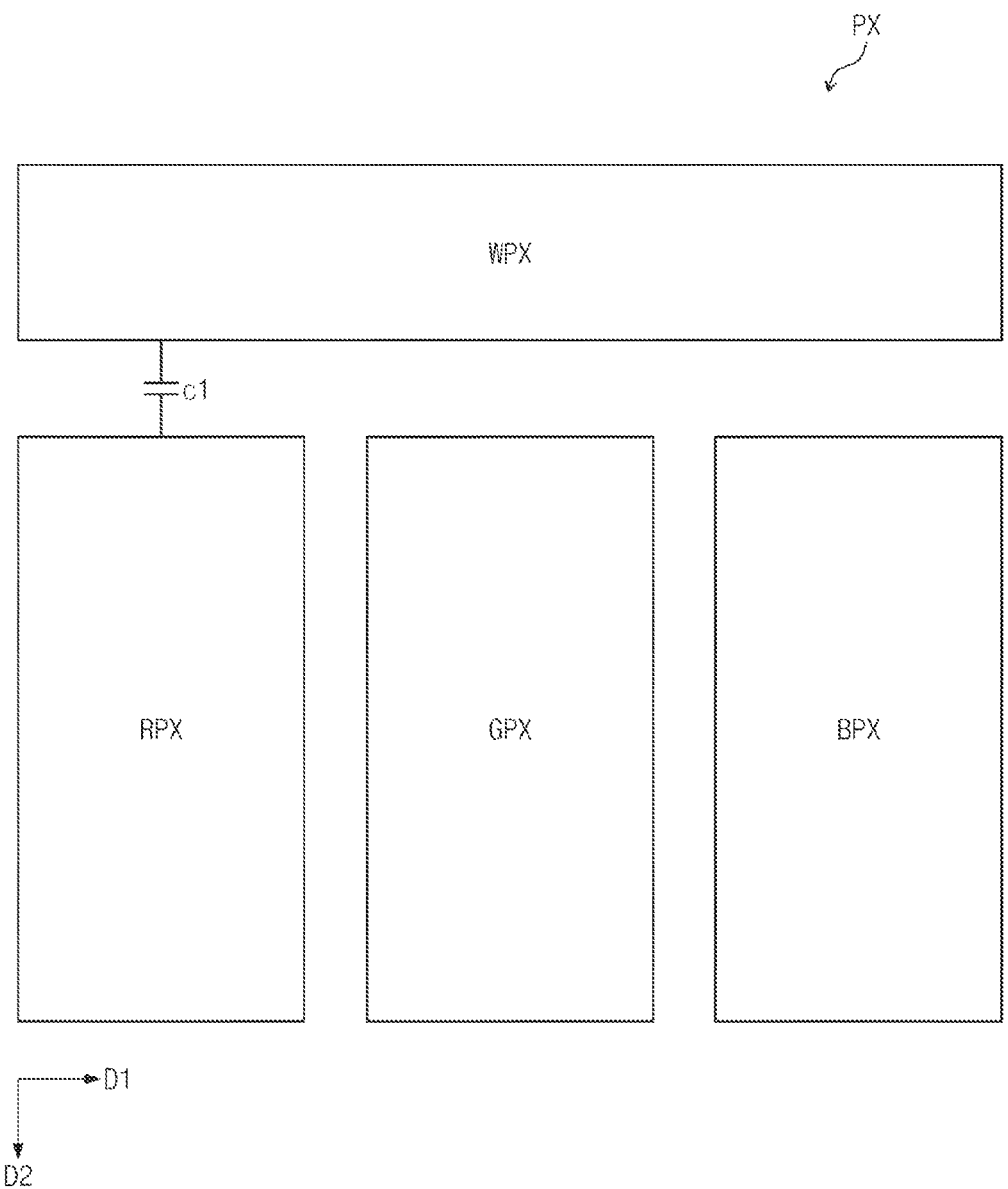
FIG. 3 is a plan view of a pixel according to another exemplary embodiment of the present disclosure.

FIG. 3 is a plan view showing a pixel according to another exemplary embodiment of the present disclosure.

As shown in FIG. 3, a white sub-pixel WPX is capacitively coupled to only a red sub-pixel RPX from among red, green, and blue sub-pixels RPX, GPX, and BPX. In an alternative embodiment, the white sub-pixel WPX may be capacitively coupled to only two sub-pixels of the red, green, and blue sub-pixels RPX, GPX, and BPX.

Also, instead of the white sub-pixel WPX, a sub-pixel displaying a different primary color, e.g., cyan, magenta, and yellow, may be capacitively coupled to at least one sub-pixel of the red, green, and blue sub-pixels RPX, GPX, and BPX. That is, the dependently-driven sub-pixel may be any color.

Figure 4:
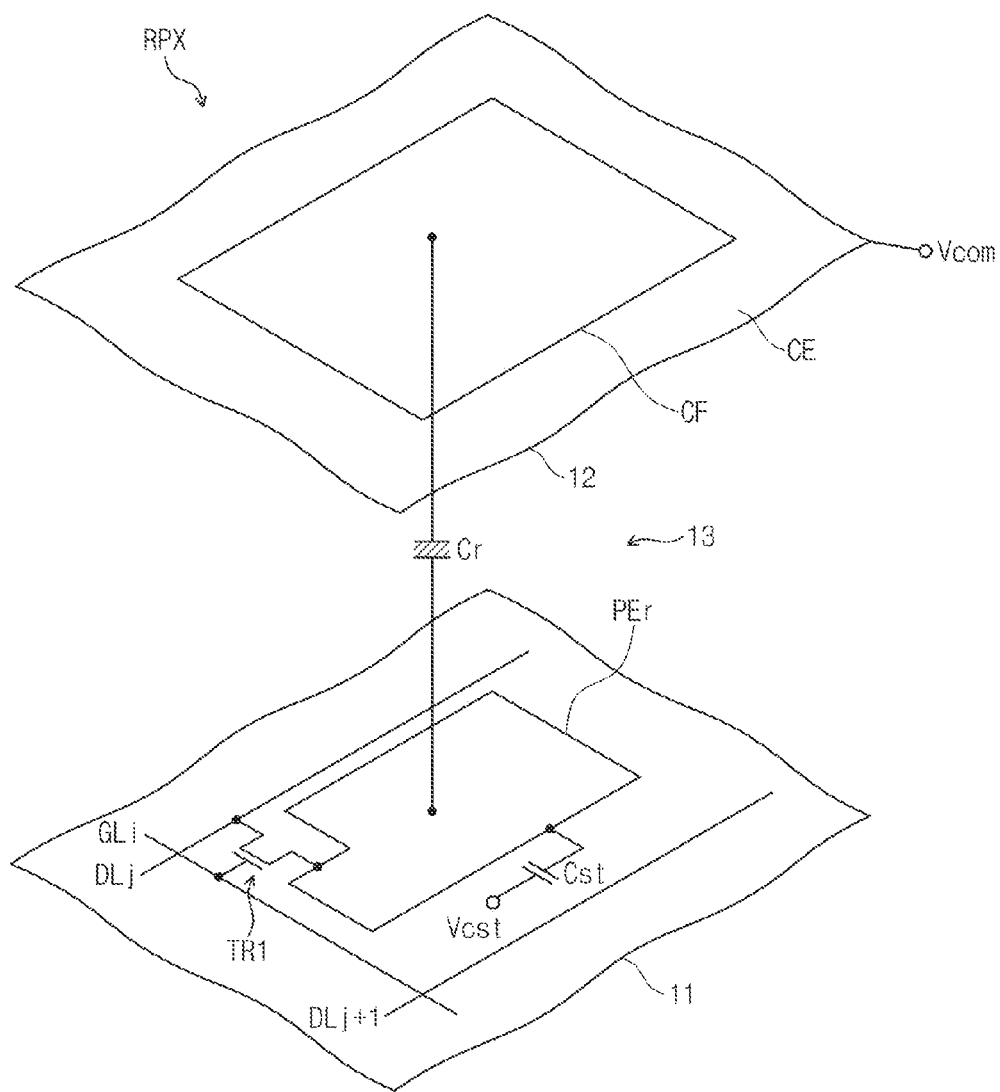
FIG. 4 is an equivalent circuit diagram of a red sub-pixel shown in FIG. 2.

FIG. 4 is an equivalent circuit diagram of the red sub-pixel shown in FIG. 2.

For convenience of explanation, FIG. 4 shows red sub-pixel RPX connected to an i-th gate line GLi and a j-th data line DLj. Referring to FIG. 4, the red sub-pixel RPX includes a pixel transistor TR1 connected to the i-th gate line GLi and the j-th data line DLj, a red liquid crystal capacitor Cr connected to the pixel transistor TR1, and a storage capacitor Cst connected in series with the red liquid crystal capacitor Cr. The storage capacitor Cst may be omitted. Hereinafter, for convenience of explanation, the pixel transistor TR1 will be referred to as a first transistor TR1.

The display panel 10 (refer to FIG. 1) includes an array substrate 11 and an opposite substrate 12 facing the array substrate 11.

The first transistor TR1 is disposed on the array substrate 11. The first transistor TR1 includes a gate connected to the i-th gate line GLi, a source connected to the j-th data line DLj, and a drain connected to the red liquid crystal capacitor Cr.

A first electrode of the red liquid crystal capacitor Cr may be a red pixel electrode PEr disposed on the array substrate 11 and a second electrode of the red liquid crystal capacitor Cr may be a common electrode CE disposed on the opposite substrate 12. A liquid crystal layer 13 is interposed between the red pixel electrode PEr and the common electrode CE. In this case, the liquid crystal layer 13 serves as a dielectric material. For instance, the liquid crystal layer 13 includes liquid crystal molecules having a negative dielectric constant and being aligned vertically. The red pixel electrode PEr is connected to the drain of the first transistor TR1.

The common electrode CE is formed substantially entirely over the opposite substrate 12, but it should not be considered as being limited thereto or thereby. For example, the common electrode CE may alternatively be disposed on the array substrate 11. When the common electrode CE is disposed on the array substrate 11, at least one of the red pixel electrode PEr and the common electrode CE includes a slit. The red sub-pixel RPX is then driven by a horizontal electric field.

The storage capacitor Cst includes the red pixel electrode PEr, a storage electrode (not shown) branched out from a storage line (not shown), and an insulating layer interposed between the red pixel electrode PEr and the storage electrode. The storage line is disposed on the array substrate 11 and can be substantially and simultaneously formed together with the i-th gate line GLi on the same layer. The storage electrode partially overlaps the red pixel electrode Per to form storage capacitor Cst.

The red sub-pixel RPX further includes a color filter CF displaying a red color. As an example, the color filter CF is disposed on the opposite substrate 12, but it should not be considered as being limited thereto or thereby. For example, the color filter CF may alternatively be disposed on the array substrate 11.

The first transistor TR1 is turned on in response to the gate signal applied through the i-th gate line GLi. The data voltage applied through the j-th data line DLj is then applied to the red pixel electrode PEr of the red liquid crystal capacitor Cr through the turned-on first transistor TR1. The common electrode CE has a common voltage Vcom applied to it.

An electric field is generated between the red pixel electrode PEr and the common electrode CE due to a difference in voltage level between the data voltage and the common voltage Vcom. The liquid crystal molecules of the liquid crystal layer 13 are driven by the resulting electric field formed between the red pixel electrode PEr and the common electrode CE. A transmittance of the light passing through the liquid crystal layer 13 is controlled by the electric field, and thus the image is displayed.

A storage voltage Vcst having a constant level is applied to the storage line. However, embodiments of the invention should not be limited as being limited thereto or thereby. For example, the storage line may have a common voltage Vcom applied thereto instead. In other words, the level of the common voltage Vcom may be substantially the same as that of the storage voltage. The storage capacitor Cst maintains a voltage charged in the red liquid crystal capacitor Cr.

Figure 5:
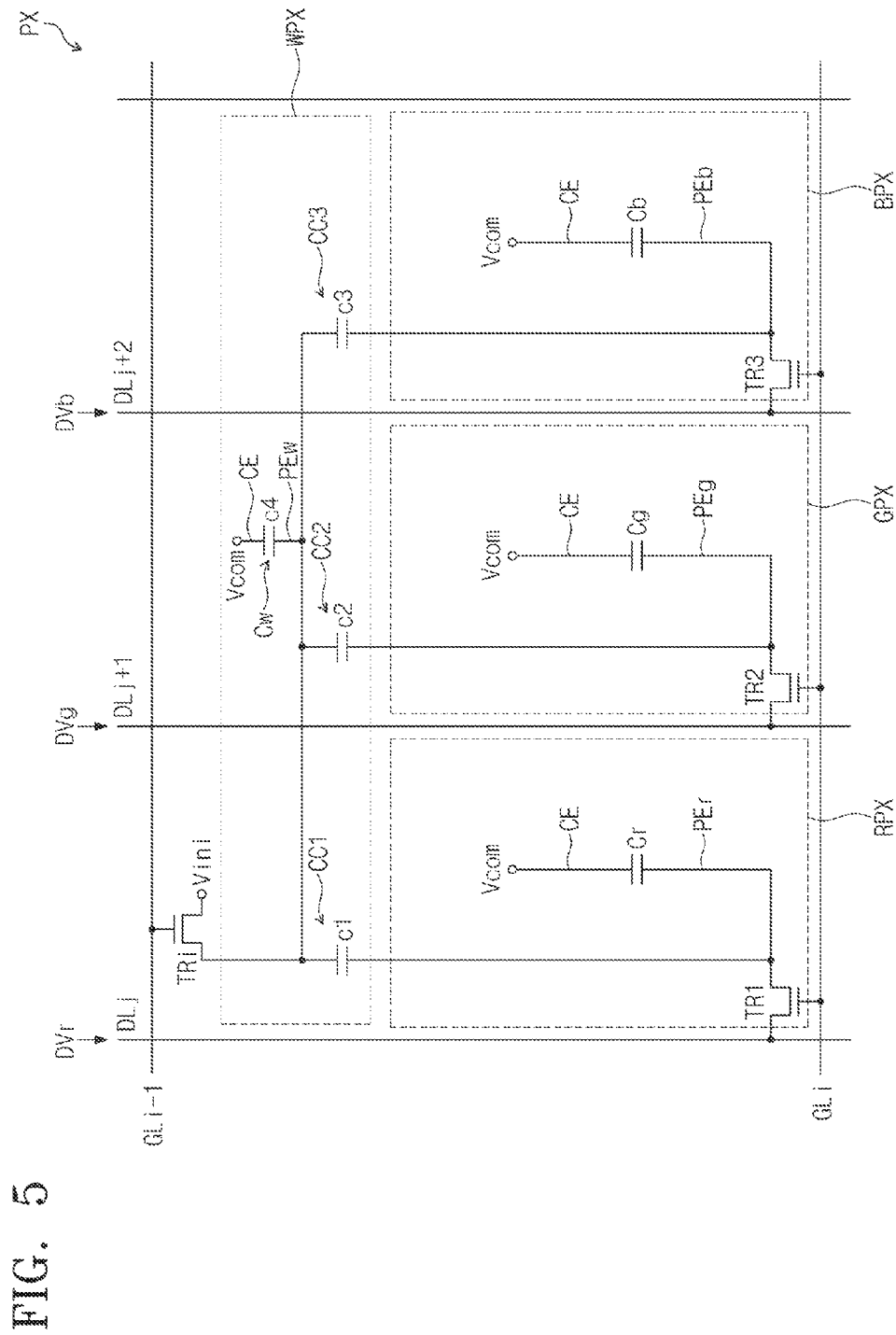
FIG. 5 is a circuit diagram of the pixel shown in FIG. 2.

FIG. 5 is a circuit diagram of the pixel shown in FIG. 2.

Referring to FIG. 5, the white, red, green, and blue sub-pixels WPX, RPX, GPX, and BPX are arranged in areas defined by an (i−1)th gate line GLi−1, the i-th gate line GLi, and the j-th data line DLj, a (j+1)th data line DLj+1, and a (j+2)th data line DLj+2.

The red sub-pixel RPX includes the first transistor TR1 and the red liquid crystal capacitor Cr. Since details of the first transistor TR1 and the red liquid crystal capacitor Cr have already been described above, descriptions of the first transistor TR1 and the red liquid crystal capacitor Cr are largely omitted below.

The green sub-pixel GPX includes a green pixel electrode PEg, a second transistor TR2, and a green liquid crystal capacitor Cg. The second transistor TR2 includes a gate connected to the i-th gate line GLi, a source connected to the (j+1)th data line DLj+1, and a drain connected to the green liquid crystal capacitor Cg. A first electrode of the green liquid crystal capacitor Cg may be the green pixel electrode PEg, and a second electrode of the green liquid crystal capacitor Cg may be the common electrode CE.

The blue sub-pixel BPX includes a blue pixel electrode PEb, a third transistor TR3, and a blue liquid crystal capacitor Cb. The third transistor TR3 includes a gate connected to the i-th gate line GLi, a source connected to the (j+2)th data line DLj+2, and a drain connected to the blue liquid crystal capacitor Cb. A first electrode of the blue liquid crystal capacitor Cb may be the blue pixel electrode PEb, and a second electrode of the blue liquid crystal capacitor Cb may be the common electrode CE.

The white sub-pixel WPX includes a white pixel electrode PEw, a white liquid crystal capacitor Cw, a first coupling capacitor CC1, a second coupling capacitor CC2, and a third coupling capacitor CC3.

For instance, a first electrode of the first coupling capacitor CC1 is connected to the drain of the first transistor TR1, and a second electrode of the first coupling capacitor CC1 may be the white pixel electrode PEw. The first coupling capacitor CC1 forms the first capacitance c1.

Additionally, a first electrode of the second coupling capacitor CC2 is connected to the drain of the second transistor TR2, and a second electrode of the second coupling capacitor CC2 may be the white pixel electrode PEw. The second coupling capacitor CC2 forms the second capacitance c2.

Also, a first electrode of the third coupling capacitor CC3 is connected to the drain of the third transistor TR3, and a second electrode of the third coupling capacitor CC3 may be the white pixel electrode PEw. The third coupling capacitor CC3 forms the third capacitance c3.

The pixel PX may further include an initialization transistor TRi. The initialization transistor TRi includes a gate connected to the (i−1)th gate line GLi−1, a source receiving an initialization voltage Vini, and a drain connected to the white pixel electrode PEw. In the present exemplary embodiment, the gate of the initialization transistor TRi is connected to the storage line and receives the storage voltage Vcst from the storage line as the initialization voltage Vini.

Hereinafter, the operation of the pixel will be described in further detail. The (i−1)th gate line GLi−1 has an (i−1)th gate signal applied thereto. The initialization transistor TRi is turned on in response to the (i−1)th gate signal and outputs the storage voltage Vcst applied thereto to the white pixel electrode PEw.

However, embodiments of the invention are not limited thereto or thereby. For example, the initialization transistor TRi may be turned on in response to another initialization control signal different from the (i−1)th gate signal from the (i−1)th gate line GLi−1. In addition, the initialization transistor TRi may be turned on in response to a k-th gate signal received from a k-th gate line instead of the (i−1)th gate line GLi−1. Here, "k" is a natural number smaller than "i".

In more detail, the storage voltage Vcst and a common voltage Vcom having the same voltage level as the storage voltage Vcst are applied to the white pixel electrode PEw and the common electrode CE. Thus, the white sub-pixel WPX is initialized by the initialization voltage Vini. The initialized white sub-pixel WPX displays a white image corresponding to 0-grayscale.

Then, an i-th gate signal is applied to the i-th gate line GLi. The first transistor TR1 is turned on in response to the i-th gate signal provided from the i-th gate line GLi, and outputs a red data voltage DVr provided from the j-th data line DLj to the red pixel electrode PEr. Thus, the red sub-pixel RPX displays an image corresponding to an electric field formed by a voltage difference between the red data voltage DVr and the common voltage Vcom. Also, the first transistor TR1 applies the red data voltage DVr to the first coupling capacitor CC1.

In addition, the second transistor TR2 is turned on in response to the i-th gate signal provided from the i-th gate line GLi, and outputs a green data voltage DVg provided from the (j+1)th data line DLj+1 to the green pixel electrode PEg. Thus, the green sub-pixel GPX displays an image corresponding to an electric field formed by a voltage difference between the green data voltage DVg and the common voltage Vcom. The second transistor TR2 also applies the green data voltage DVg to the second coupling capacitor CC2.

The third transistor TR3 is turned on in response to the i-th gate signal provided from the i-th gate line GLi, and outputs a blue data voltage DVb provided from the (j+2)th data line DLj+2 to the blue pixel electrode PEb. Thus, the blue sub-pixel BPX displays an image corresponding to an electric field formed by a voltage difference between the blue data voltage DVb and the common voltage Vcom. The third transistor TR3 also applies the blue data voltage DVb to the third coupling capacitor CC3.

The white pixel electrode PEw is coupled to the drain electrodes of the first, second, and third transistors TR1, TR2, and TR3 by the first, second, and third coupling capacitors CC1, CC2, and CC3. Thus, when the red, green, and blue data voltages DVr, DVg, and DVb are respectively applied to the red, green, and blue sub-pixels RPX, GPX, and BPX, a coupling voltage is also applied to the white pixel electrode PEw by the red, green, and blue data voltages DVr, DVg, and DVb. Consequently, the white sub-pixel WPX displays an image corresponding to an electric field formed by a voltage difference between the coupling voltage and the common voltage Vcom.

The coupling voltage is determined by the red, green, and blue data voltages DVr, DVg, and DVb and the first, second, and third capacitances c1 to c3. More particularly, as the capacitances c1 to c3 increase, the coupling voltage receives more influence from the data voltages applied to their corresponding sub-pixels. In addition, as the red, green, and blue data voltages DVr, DVg, and DVb increase, the coupling voltage increases.

The coupling voltage satisfies the following Equation 1.

$$Vcp \approx \frac{c1}{c4}(DVr - Vini) + \frac{c2}{c4}(DVg - Vini) + \frac{c3}{c4}(DVb - Vini) \quad \text{Equation 1}$$

In Equation 1, Vcp denotes the coupling voltage and c4 denotes the capacitance of the white liquid crystal capacitor Cw. As the data voltages DVr, DVg, and DVb and the capacitances c1, c2, and c3 increase, the coupling voltage increases.

As described above, when the white sub-pixel WPX includes the first, second, and third coupling capacitors CC1, CC2, and CC3, the white sub-pixel WPX displays an image corresponding to the coupling voltage, which is determined by the red, green, and blue data voltages DVr, DVg, and DVb. Therefore, a separate data line required to drive the white sub-pixel WPX, a driving circuit of the data driver 30 (refer to FIG. 1) required to generate the data voltage applied to the white sub-pixel WPX, and a white driving algorithm to be processed by the controller 40 (refer to FIG. 1) are unnecessary. As a result, structures of the display panel 10, the data driver 30, and the controller 40 are simplified. Also, a power consumption of the display device 1000 (refer to FIG. 1) is reduced.

Figure 6:
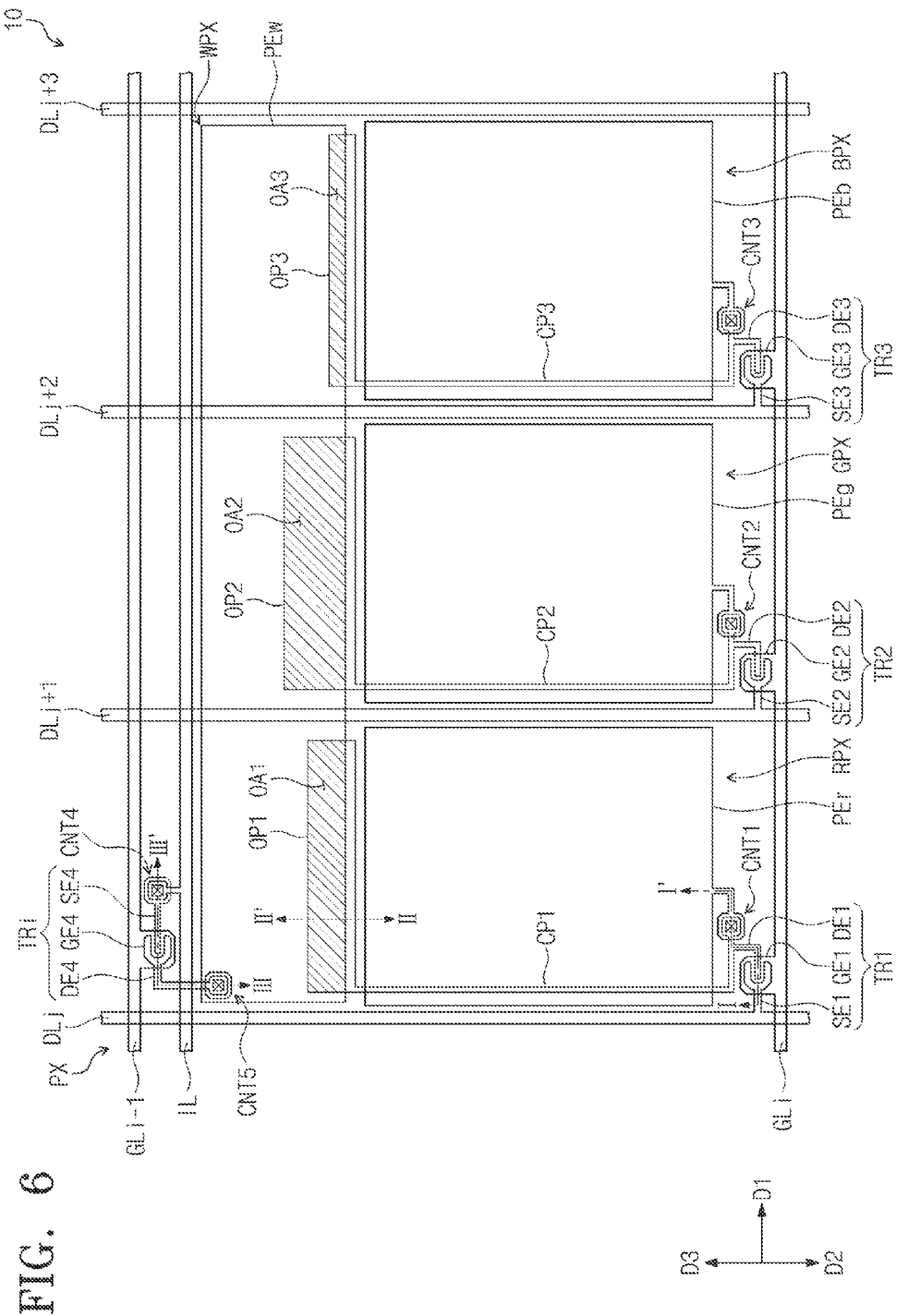
FIG. 6 is a plan view showing details of a display panel including the pixel shown in FIG. 5.
Figure 7:
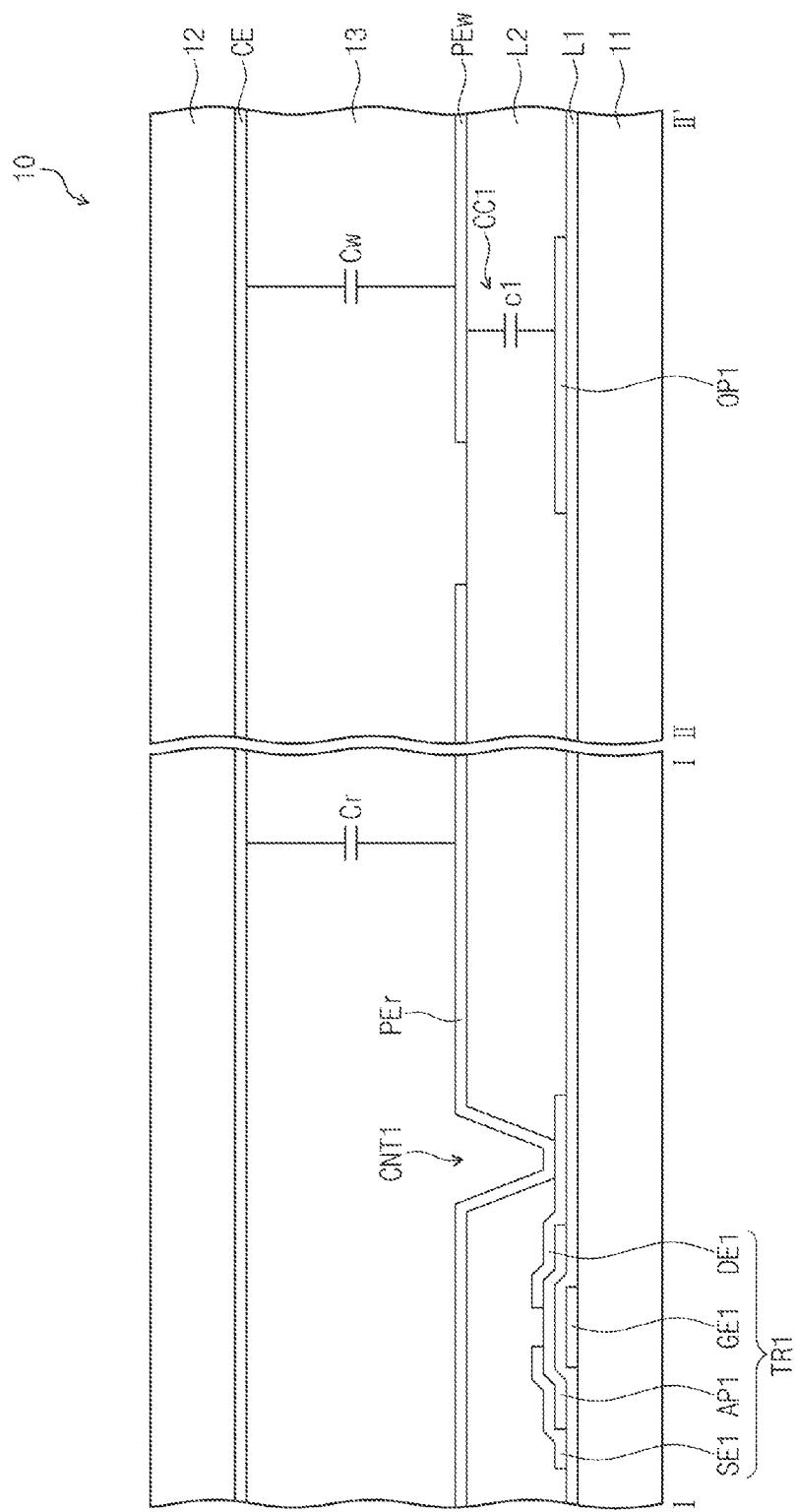
FIG. 7 is a cross-sectional view taken along lines I-I' and II-II' of FIG. 6.

FIG. 6 is a plan view showing a display panel including the pixel shown in FIG. 5, and FIG. 7 is a cross-sectional view taken along lines I-I' and II-II' of FIG. 5. The layout of the pixel PX will be described in detail with reference to FIGS. 6 and 7.

The first transistor TR1 includes a first gate electrode GE1, a first active pattern AP1, a first source electrode SE1, and a first drain electrode DE1. The first gate electrode GE1 branches out from the i-th gate line GLi and the first active pattern AP1 is disposed on the first gate electrode GE1 such that a first insulating layer L1 is interposed between the first active pattern AP1 and the first gate electrode GE1. The first source electrode SE1 branches out from the j-th data line DLj to make contact with the first active pattern AP1, and the first drain electrode DE1 is spaced apart from the first source electrode SE1 to also make contact with the first active pattern AP1.

A second insulating layer L2 covers the first transistor TR1. The red pixel electrode PEr is disposed on the second insulating layer L2 and makes contact with the first drain electrode DE1 through a first contact hole CNT1 formed through the second insulating layer L2.

In the present exemplary embodiment, the first active pattern AP1 includes a semiconductor material such as amorphous silicon and crystalline silicon, but it is not limited thereto or thereby. That is, the first active pattern AP1 may include any other suitable semiconductor material. This may include an oxide semiconductor, such as, for instance, IGZO, ZnO, $SnO_2$, $In_2O_3$, $Zn_2SnO_4$, $Ge_2O_3$, and $HfO_2$ and any compound semiconductor, such as, GaAs, GaP, and InP.

The first drain electrode DE1 includes a first connection part CP1 and a first overlap part OP1. One end of the first connection part CP1 is provided at a position proximate to the first gate electrode GE1 and the other end of the first connection part CP1 extends in a third direction D3 opposite to the second direction D2. The first connection part CP1 partially overlaps the red pixel electrode PEr at one side of the red pixel electrode PEr to improve a transmittance of the red sub-pixel RPX.

The first overlap part OP1 branches out from the other end of the first connection part CP1 to extend partially underneath (i.e. to partially overlap) the white pixel electrode PEw. More specifically, the first overlap part OP1 is insulated from the white pixel electrode PEw disposed on the second insulating layer L2 and overlaps at least a portion of the white pixel electrode PEw. The first overlap part OP1 overlaps the white pixel electrode PEw to form a first overlap area OA1. The first coupling capacitor CC1 is formed by the overlap between the first overlap part OP1 and the white pixel electrode PEw. In this case, the first capacitance c1 is determined partly by the first overlap area OA1. More particularly, as the first overlap area OA1 becomes greater, the first capacitance c1 increases. In addition, the first overlap part OP1 may not overlap with the red pixel electrode PEr in order to improve the transmittance of the red sub-pixel RPX.

The second transistor TR2 includes a second gate electrode GE2, a second source electrode SE2, and a second drain electrode DE2. Since the structure of the second transistor TR2 is substantially the same as that of the first transistor TR1 except for parts of the second drain electrode DE2, details of corresponding elements will be omitted.

The second drain electrode DE2 includes a second connection part CP2 and a second overlap part OP2. One end of the second connection part CP2 is provided at a position proximate to the second gate electrode GE2 and the other end of the second connection part CP2 extends in the third direction D3. The second connection part CP2 partially overlaps the green pixel electrode PEg at one side of the green pixel electrode PEg to improve a transmittance of the green sub-pixel GPX.

The second overlap part OP2 branches out from the other end of the second connection part CP2 to extend partially underneath (i.e. to partially overlap) the white pixel electrode PEw. More specifically, the second overlap part OP2 is insulated from the white pixel electrode PEw and overlaps at least a portion of the white pixel electrode PEw. The second overlap part OP2 overlaps the white pixel electrode PEw in a second overlap area OA2. The second coupling capacitor CC2 (refer to FIG. 5) is formed by the overlap between the second overlap part OP2 and the white pixel electrode PEw. In this case, the second capacitance c2 (refer to FIG. 5) is determined partly by the second overlap area OA2. More particularly, as the second overlap area OA2 becomes greater, the second capacitance c2 increases. In addition, the second overlap part OP2 may not overlap the green pixel electrode PEg in order to improve the transmittance of the green sub-pixel GPX.

The third transistor TR3 includes a third gate electrode GE3, a third source electrode SE3, and a third drain electrode DE3. Since the structure of the third transistor TR3 is substantially the same as that of the first transistor TR1 except for parts of the third drain electrode DE3, details of corresponding elements will be omitted.

The third drain electrode DE3 includes a third connection part CP3 and a third overlap part OP3. One end of the third connection part CP3 is provided at a position proximate to the third gate electrode GE3 and the other end of the third connection part CP3 extends in the third direction D3. The third connection part CP3 partially overlaps the blue pixel electrode PEb at one side of the blue pixel electrode PEb to improve a transmittance of the blue sub-pixel BPX.

The third overlap part OP3 branches out from the other end of the third connection part CP3 to extend partially underneath (i.e. to partially overlap) the white pixel electrode PEw. More specifically, the third overlap part OP3 is insulated from the white pixel electrode PEw and overlaps at least a portion of the white pixel electrode PEw. The third overlap part OP3 overlaps the white pixel electrode PEw at a third overlap area OA3. The third coupling capacitor CC3 (refer to FIG. 5) is formed by the overlap between the third overlap part OP3 and the white pixel electrode PEw. In this case, the third capacitance c3 (refer to FIG. 5) is determined partly by the third overlap area OA3. More particularly, as the third overlap area OA3 becomes greater, the third capacitance c3 increases. In addition, the third overlap part OP3 may not overlap the blue pixel electrode PEb in order to improve the transmittance of the blue sub-pixel BPX.

The first, second, and third overlap areas OA1, OA2, and OA3 have different areas from each other. For instance, the second overlap area OA2 has the largest area, and the third overlap area OA3 has the smallest area. Thus, the second capacitance c2 is the biggest and the third capacitance c3 is the smallest. Since the first, second, and third capacitances c1, c2, and c3 are determined as described above, the grayscale of the white image displayed by the white sub-pixel WPX is mainly determined by the green data voltage DVg, and the blue data voltage DVb has a lesser influence on the grayscale of the white image. Therefore, an original image is prevented from being distorted by the white image since luminance coefficient of green is higher than luminance coefficients of blue and red and white image is mainly determined by a color with higher luminance coefficient.

Figure 8:
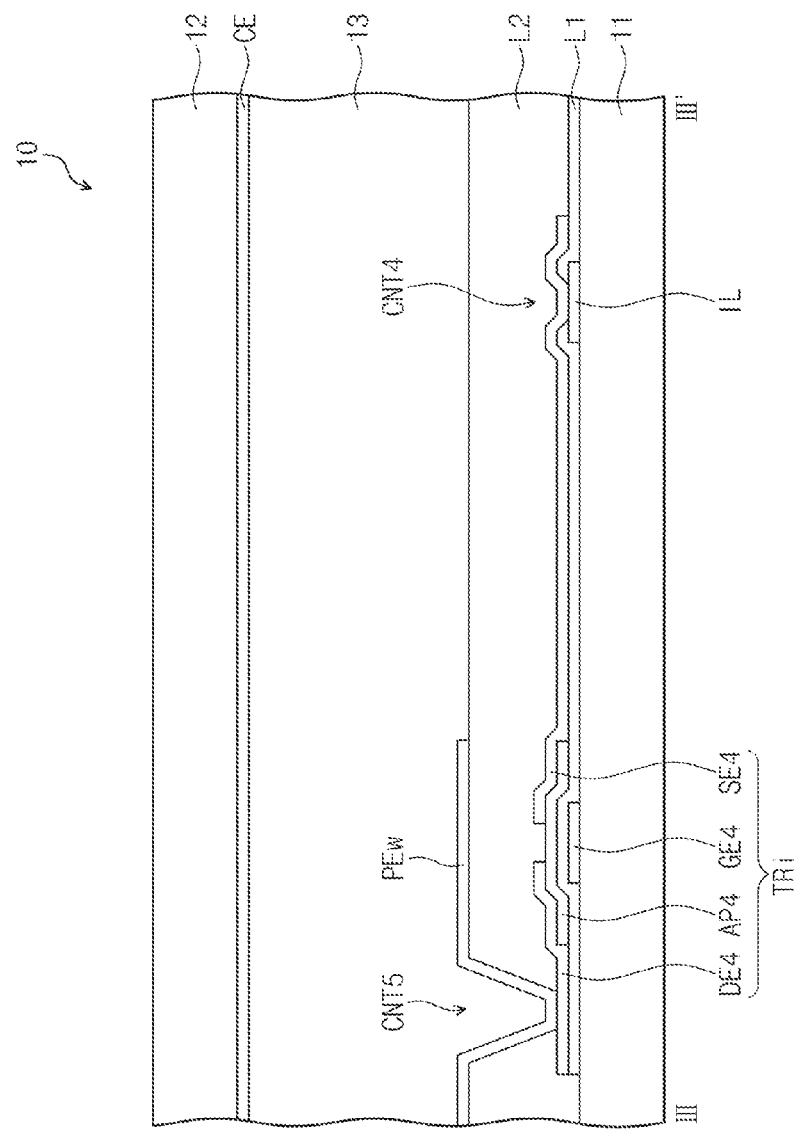
FIG. 8 is a cross-sectional view taken along a line III-III' of FIG. 6.

FIG. 8 is a cross-sectional view taken along a line III-III' of the pixel shown in FIG. 5.

Hereinafter, the layout of the initialization transistor TRi will be described with reference to FIGS. 6 and 8.

In the present exemplary embodiment, the display panel 10 further includes an initialization line IL providing the initialization voltage Vini. The initialization line IL can extend in the first direction D1 and can be disposed between the (i−1)th gate line GLi−1 and the white pixel electrode PEw. The initialization line IL is insulated from the gate lines GLi−1 and GLi and the data lines DLj, DLj+1, and DLj+2 in known manner. The initialization line IL may be disposed between the first insulating layer L1 and the array substrate 11.

The initialization transistor TRi includes a fourth gate electrode GE4, a fourth active pattern AP4, a fourth source electrode SE4, and a fourth drain electrode DE4. The fourth gate electrode GE4 branches out from the (i−1)th gate line GLi−1. The fourth gate electrode GE4 may be formed on the same layer as the initialization line IL.

The fourth active pattern AP4 is disposed on the fourth gate electrode GE4 such that the first insulating layer L1 is interposed between the fourth active pattern AP4 and the fourth gate electrode GE4. One end of the fourth source electrode SE4 makes contact with the fourth active pattern AP4 and the other end of the fourth source electrode SE4 makes contact with the initialization line IL through a fourth contact hole CNT4 formed through the first insulating layer L1. The fourth drain electrode DE4 is spaced apart from the fourth source electrode SE4 and makes contact with the fourth active pattern AP4.

The second insulating layer L2 covers the initialization transistor TRi. The white pixel electrode PEw is disposed on the second insulating layer L2. The white pixel electrode PEw makes contact with the fourth drain electrode DE4 through a fifth contact hole CNT5 formed through the second insulating layer L2.

Figure 9:
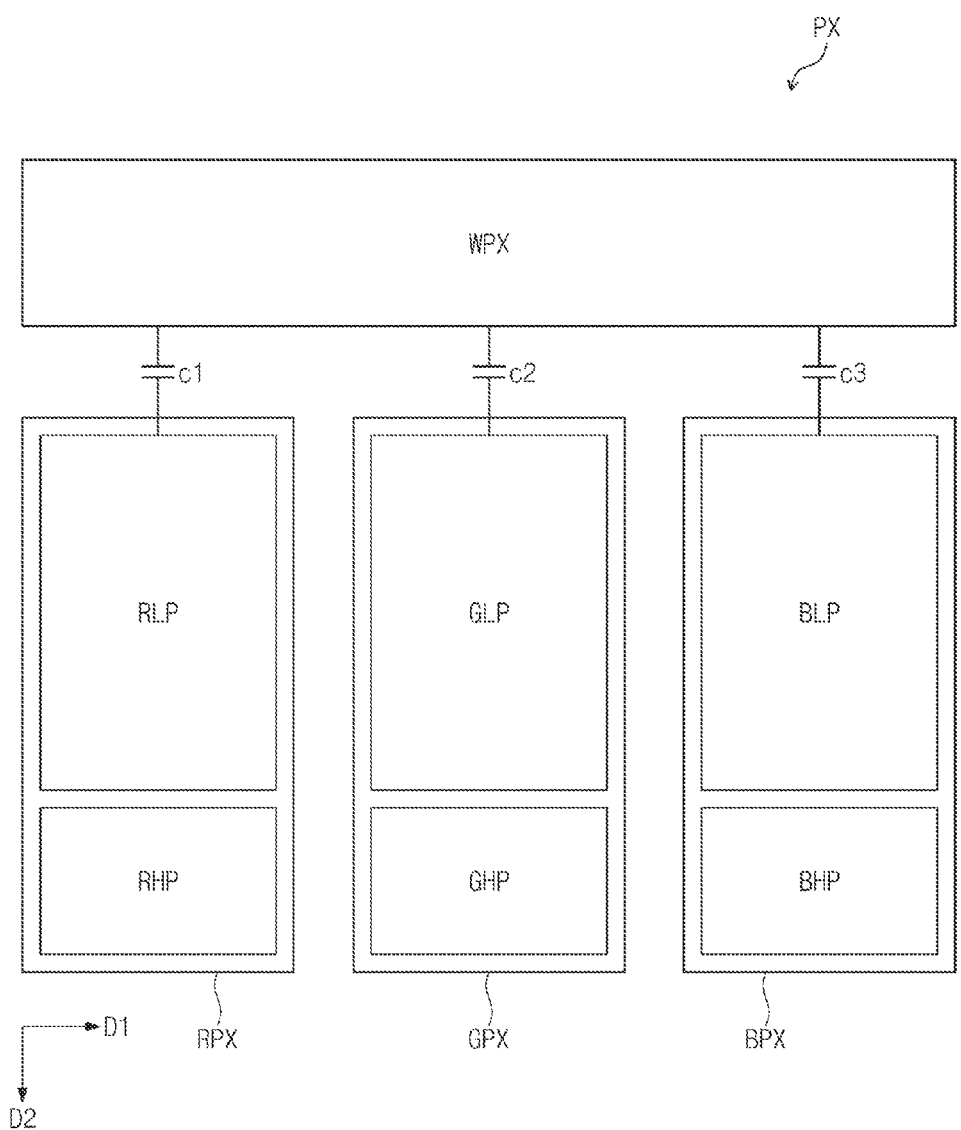
FIG. 9 is a plan view showing a pixel according to another exemplary embodiment of the present disclosure.

FIG. 9 is a plan view showing a pixel according to another exemplary embodiment of the present disclosure. Since the pixel PX shown in FIG. 9 has a structure similar to the structure of the pixel PX shown in FIG. 2, descriptions of corresponding elements will be omitted.

Referring to FIG. 9, a red sub-pixel RPX includes a red high sub-pixel RHP and a red low sub-pixel RLP. The level of a voltage applied to the red high sub-pixel RHP is higher than the level of a voltage applied to the red low sub-pixel RLP. Thus, the brightness of the image displayed in the red high sub-pixel RHP is higher than a brightness of the image displayed in the red low sub-pixel RLP.

A green sub-pixel GPX includes a green high sub-pixel GHP and a green low sub-pixel GLP. The level of a voltage applied to the green high sub-pixel GHP is higher than the level of a voltage applied to the green low sub-pixel GLP. Thus, the brightness of an image displayed in the green high sub-pixel GHP is higher than the brightness of an image displayed in the green low sub-pixel GLP.

A blue sub-pixel BPX includes a blue high sub-pixel BHP and a blue low sub-pixel BLP. The level of a voltage applied to the blue high sub-pixel BHP is higher than the level of a voltage applied to the blue low sub-pixel BLP. Thus, the brightness of an image displayed in the blue high sub-pixel BHP is higher than the brightness of an image displayed in the blue low sub-pixel BLP.

In the present exemplary embodiment, the low sub-pixels RLP, GLP, and BLP are each disposed adjacent to a white sub-pixel WPX. More particularly, the low sub-pixels RLP, GLP, and BLP are disposed between the white sub-pixel WPX and the respective high sub-pixels RHP, GHP, and BHP.

As described above, since each of the sub-pixels RPX, GPX, and BPX includes high sub-pixels RHP, GHP, and BHP and low sub-pixels RLP, GLP, and BLP, the image displayed in the pixel PX is prevented from being distorted due to a viewing angle of a user. That is, the viewing angle of the pixel PX is improved. To be specific, since the voltage applied to high sub-pixels RHP, GHP, and BHP is different from the voltage applied to low sub-pixels RLP, GLP, and BLP, inclined angle of liquid crystal molecule located inside the high sub-pixels RHP, GHP, and BHP is different from inclined angle of liquid crystal molecule located inside the low sub-pixels RLP, GLP, and BLP. Therefore, polarization of a light modulated by the liquid crystal molecules became less dependent on the viewing angle.

The white sub-pixel WPX overlaps the low sub-pixels RLP, GLP, and BLP and is thus capacitively coupled to the low sub-pixels RLP, GLP, and BLP. In more detail, a first capacitance c1 is formed between the white sub-pixel WPX and the red low sub-pixel RLP, a second capacitance c2 is formed between the white sub-pixel WPX and the green low sub-pixel GLP, and a third capacitance c3 is formed between the white sub-pixel WPX and the blue low sub-pixel BLP. The first, second, and third capacitances c1, c2, and c3 have different values from each other.

As described above, the white sub-pixel WPX is coupled to the red, green, and blue sub-pixels RPX, GPX, and BPX to be dependently driven. Thus, a separate data line required to drive the white sub-pixel WPX, a driving circuit of the data driver 30 (refer to FIG. 1) required to generate the data voltage applied to the white sub-pixel WPX, and a white driving algorithm for the controller 40 are not necessary. As a result, structures of the display panel 10, the data driver 30, and the controller 40 are simplified. Also, power consumption of the display device 1000 is reduced.

In addition, the white sub-pixel WPX is coupled to the low sub-pixels RLP, GLP, and BLP, which receive a voltage having a relatively lower level than the level of the voltage applied to the high sub-pixels RHP, GHP, and BHP, and thus the white sub-pixel WPX may more finely control the grayscale.

For instance, in one embodiment, red, green, and blue data voltages DVr, DVg, and DVb corresponding to a 200-grayscale level are applied to the red, green, and blue sub-pixels RPX, GPX, BPX, voltages corresponding to a 100-grayscale level are applied to the low sub-pixels RLP, GLP, and BLP and the low sub-pixels RLP, GLP, and BLP allow voltages respectively corresponding to 20-, 50-, and 5-grayscale levels to be coupled to the white sub-pixel WPX. As a result, a voltage corresponding to a 75-grayscale level is applied to the white sub-pixel WPX, and thus the white sub-pixel WPX displays a white image corresponding to the 75-grayscale level.

However, embodiments of the invention should not be considered as being limited thereto or thereby. For example, the white sub-pixel WPX may be capacitively coupled to the high sub-pixels RHP, GHP, and BHP instead of the low sub-pixels RLP, GLP, and BLP. When the white sub-pixel WPX is capacitively coupled to the low sub-pixels RLP, GLP, and BLP, the first, second, and third capacitances c1, c2, and c3 are insufficient to drive the white sub-pixel WPX such that the white sub-pixel WPX displays an image corresponding to 255-grayscale levels. If WPX is instead capacitively coupled to the high sub-pixels RHP, GHP, and BHP, the high sub-pixels RHP, GHP, and BHP, and thus the white sub-pixel WPX, receive higher level voltages, and the white sub-pixel WPX may thus be driven to display the image with 255-grayscale levels. That is, capacitively coupling WPX to the high sub-pixels instead of the low sub-pixels may allow WPX to be driven to higher grayscale levels.

Figure 10:
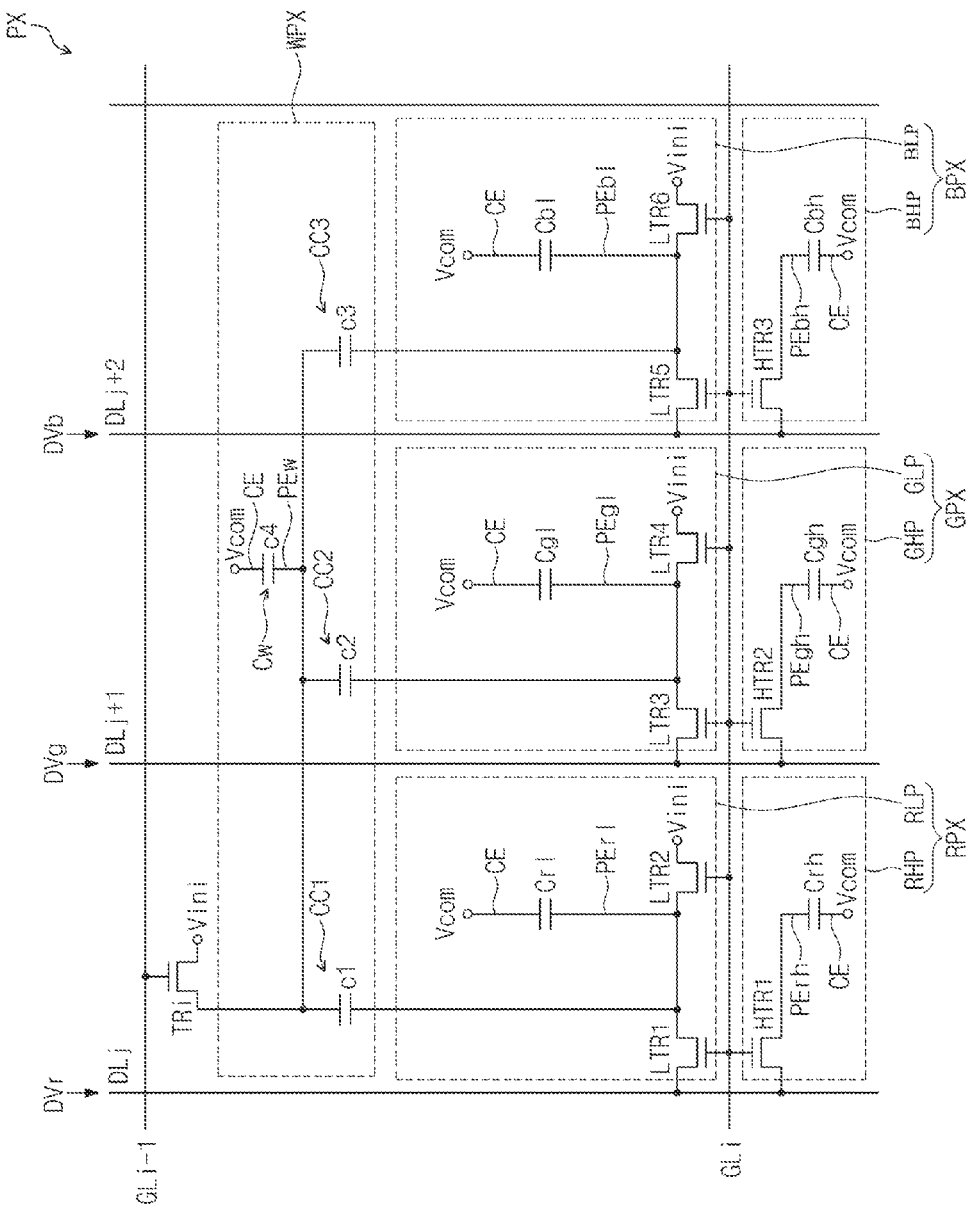
FIG. 10 is a plan view showing details of a display panel including the pixel shown in FIG. 9.

FIG. 10 is a plan view showing details of a display panel including the pixel of FIG. 9.

Referring to FIG. 10, the white, red, green, and blue sub-pixels WPX, RPX, GPX, and BPX are arranged in areas at least partially defined by an (i−1)th gate line GLi−1, an i-th gate line GLi and a j-th data line DLj, a (j+1)th data line DLj+1, and a (j+2)th data line DLj+2.

The red low sub-pixel RLP and the red high sub-pixel RHP are sequentially arranged along a second direction D2 such that the i-th gate line GLi is interposed between the red low sub-pixel RLP and the red high sub-pixel RHP.

The red low sub-pixel RLP includes a first low transistor LTR1, a second low transistor LTR2, a red low pixel electrode PErl, and a red low liquid crystal capacitor Crl. The red high sub-pixel RHP includes a first high transistor HTR1, a red high pixel electrode PErh, and a red high liquid crystal capacitor Crh.

A first electrode of the red low liquid crystal capacitor Crl is the red low pixel electrode PErl and a second electrode of the red low liquid crystal capacitor Crl is a common electrode CE. A first electrode of the red high liquid crystal capacitor Crh is the red high pixel electrode PErh and a second electrode of the red high liquid crystal capacitor Crh is the common electrode CE.

The first high transistor HTR1 includes a gate connected to the i-th gate line GLi, a source connected to the j-th data line DLj, and a drain connected to the red high liquid crystal capacitor Crh.

Thus, when the first high transistor HTR1 is turned on in response to a gate signal, a red data voltage DVr is applied to the red high pixel electrode PErh.

The first and second low transistors LTR1 and LTR2 apply a sub-red data voltage, having a different voltage level from that of the red data voltage DVr, to the red low pixel electrode PErl. The sub-red data voltage is determined partially by the red data voltage DVr.

The first low transistor LTR1 includes a gate connected to the i-th gate line GLi, a source connected to the j-th data line DLj, and a drain connected to the red low liquid crystal capacitor Crl.

The second low transistor LTR2 includes a gate connected to the i-th gate line GLi, a drain connected to the first low transistor LTR1, and a source receiving a storage voltage Vcst (Vini). However, the voltage (hereinafter, referred to as a down voltage) applied to the source of the second low transistor LTR2 should not be limited to the storage voltage Vcst, and may instead be any other suitable voltage. A voltage having a voltage level lower than the red data voltage DVr may be used as the down voltage.

The first high transistor HTR1 and the first low transistor LTR1 may have the same size. A size of the second low transistor LTR2 may be smaller than that of the first low transistor LTR1.

The first and second low transistors LTR1 and LTR2 are turned on in response to the gate signal applied through the i-th gate line GLi. The turned-on first low transistor LTR1 applies the red data voltage DVr provided through the j-th data line DLj to the red low pixel electrode PErl. The second low transistor LTR2 applies the storage voltage Vcst to the red low pixel electrode PErl to decrease the voltage level of the red data voltage DVr.

In more detail, the voltage applied to the red low pixel electrode PErl corresponds to a voltage obtained by a voltage-dividing operation according to resistance values of the first and second low transistors LTR1 and LTR2 when the first and second low transistors LTR1 and LTR2 are turned on. In this case, the voltage applied to the red low pixel electrode PErl corresponds to the sub-red data voltage, i.e. a data voltage below that of the red data voltage DVr. The sub-red data voltage has a voltage level corresponding to an intermediate value between the red data voltage DVr and the storage voltage Vcst.

In conclusion, the first and second low transistors LTR1 and LTR2 and the first high transistor HTR1 are turned on in response to the gate signal. Then, the red data voltage DVr is applied to the red high pixel electrode PErh through the turned-on first high transistor HTR1, while a sub-red data voltage lower than DVr is applied to the red low pixel electrode PErl through the turned-on first low transistor LTR1. Thus, the red low pixel electrode PErl and the red high pixel electrode PErh are driven by different data voltages, and the red low sub-pixel RLP and the red high sub-pixel RHP therefore display an image at different grayscales.

Similarly, the green low sub-pixel GLP and the green high sub-pixel GHP are sequentially arranged along the second direction D2 such that the i-th gate line GLi is interposed between the green low sub-pixel GLP and the green high sub-pixel GHP.

The green low sub-pixel GLP includes a third low transistor LTR3, a fourth low transistor LTR4, a green low pixel electrode PEgl, and a green low liquid crystal capacitor Cgl. The green high sub-pixel GHP includes a second high transistor HTR2, a green high pixel electrode PEgh, and a green high liquid crystal capacitor Cgh.

A first electrode of the green low liquid crystal capacitor Cgl is the green low pixel electrode PEgl and a second electrode of the green low liquid crystal capacitor Cgl is the common electrode CE. A first electrode of the green high liquid crystal capacitor Cgh is the green high pixel electrode PEgh and a second electrode of the green high liquid crystal capacitor Cgh is the common electrode CE.

Similar to the above, the blue low sub-pixel BLP and the blue high sub-pixel BHP are sequentially arranged along the second direction D2 to allow the i-th gate line GLi to be interposed between the blue low sub-pixel BLP and the blue high sub-pixel BHP.

The blue low sub-pixel BLP includes a fifth low transistor LTR5, a sixth low transistor LTR6, a blue low pixel electrode PEbl, and a blue low liquid crystal capacitor Cbl. The blue high sub-pixel BHP includes a third high transistor HTR3, a blue high pixel electrode PEbh, and a blue high liquid crystal capacitor Cbh.

A first electrode of the blue low liquid crystal capacitor Cbl is the blue low pixel electrode PEbl and a second electrode of the blue low liquid crystal capacitor Cbl is the common electrode CE. A first electrode of the blue high liquid crystal capacitor Cbh is the blue high pixel electrode PEbh and a second electrode of the blue high liquid crystal capacitor Cbh is the common electrode CE.

Since the structures of the green low sub-pixel GLP and the blue low sub-pixel BLP are similar to that of the red low sub-pixel RLP and the structures of the green high sub-pixel GHP and the blue high sub-pixel BHP are similar to that of the red high sub-pixel RHP, descriptions of corresponding elements will be omitted.

The white sub-pixel WPX includes a white pixel electrode PEw, a white liquid crystal capacitor Cw, and first, second, and third coupling capacitors CC1, CC2, and CC3.

A first electrode of the first coupling capacitor CC1 is connected to the drain of the first low transistor LTR1 and a second electrode of the first coupling capacitor CC1 is the white pixel electrode PEw. The first coupling capacitor CC1 forms the first capacitance c1.

A first electrode of the second coupling capacitor CC2 is connected to a drain of the third low transistor LTR3 and a second electrode of the second coupling capacitor CC2 is the white pixel electrode PEw. The second coupling capacitor CC2 forms the second capacitance c2.

A first electrode of the third coupling capacitor CC3 is connected to a drain of the fifth low transistor LTR5 and a second electrode of the third coupling capacitor CC3 is the white pixel electrode PEw. The third coupling capacitor CC3 forms the third capacitance c3.

The pixel PX may further include an initialization transistor Tri, as above. The structure of the initialization transistor TRi is substantially the same as previously described, and thus details thereof will be omitted.

Figure 11:
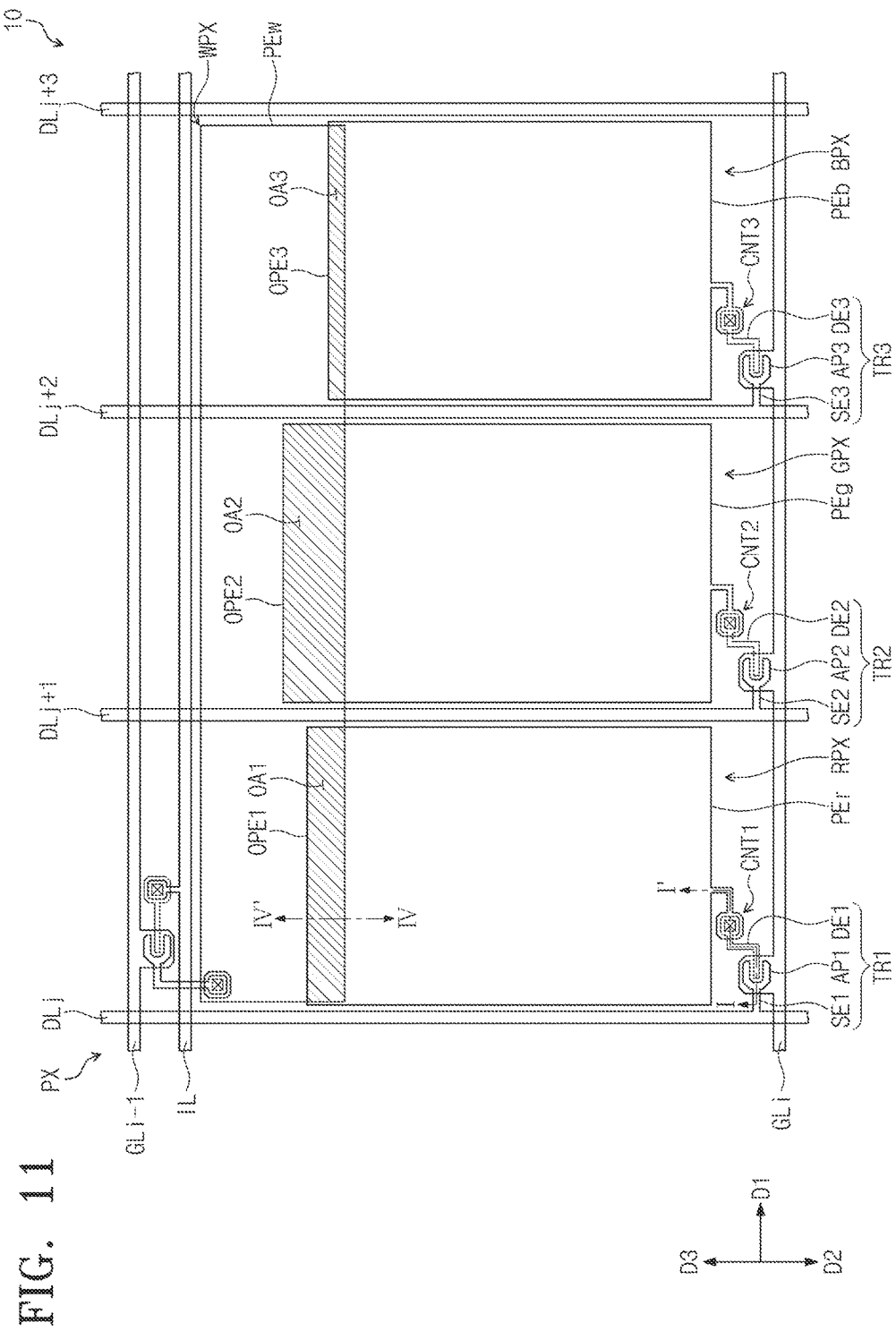
FIG. 11 is a plan view showing details of a display panel including the pixel shown in FIG. 5 according to another exemplary embodiment of the present disclosure.
Figure 12:
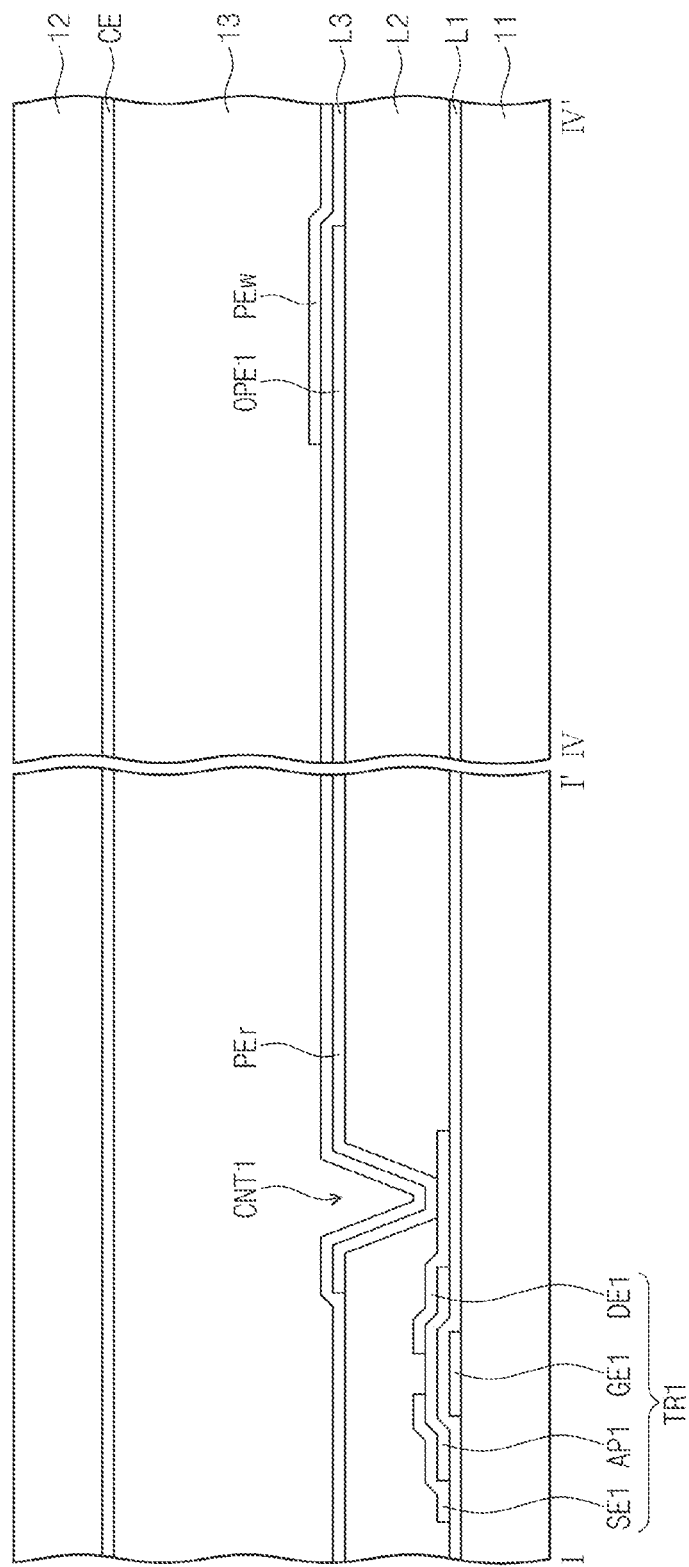
FIG. 12 is a cross-sectional view taken along lines I-I' and IV-IV' of FIG. 11.

FIG. 11 is a plan view showing a display panel including the pixel shown in FIG. 5 according to another exemplary embodiment of the present disclosure, and FIG. 12 is cross-sectional view taken along lines I-I' and IV-IV' of FIG. 11. The layout of the pixel PX will be described with reference to FIGS. 11 and 12.

The structure of the pixel PX is substantially the same as the structure of the pixel PX shown in FIG. 6 except that no overlap parts OP1, OP2, and OP3 are present, and instead, the red, green and blue pixel electrodes Per, Peg, and PEb themselves overlap the white pixel electrode Pew. Repetitive descriptions of corresponding elements will be omitted.

Referring to FIG. 11, the red pixel electrode PEr includes a first overlap pixel electrode OPE1, which is a portion of the red pixel electrode Per that extends under the white sub-pixel WPX. That is, the first overlap pixel electrode OPE1 overlaps at least a portion of the white sub-pixel WPX. More particularly, the first overlap pixel electrode OPE1 overlaps the white pixel electrode PEw to form the first overlap area OA1.

The green pixel electrode PEg includes a second overlap pixel electrode OPE2. The second overlap pixel electrode OPE2, which is a portion of the green pixel electrode Peg that extends under the white sub-pixel WPX. That is, the second overlap pixel electrode OPE2 overlaps at least a portion of the white sub-pixel WPX. More particularly, the second overlap pixel electrode OPE2 overlaps the white pixel electrode PEw to form the second overlap area OA2.

The blue pixel electrode PEb includes a third overlap pixel electrode OPE3. The third overlap pixel electrode OPE3, which is a portion of the blue pixel electrode Peb that extends under the white sub-pixel WPX. That is, the third overlap pixel electrode OPE3 overlaps at least a portion of the white sub-pixel WPX. More particularly, the third overlap pixel electrode OPE3 overlaps the white pixel electrode PEw to form the third overlap area OA3.

As shown in FIG. 12, the display panel 10 further includes a third insulating layer L3 covering the second insulating layer L2 and the red pixel electrode PEr. The third insulating layer L3 also extends over the green and blue pixel electrodes Peg, PEb so that it insulates the white pixel electrode PEw from each of the red, green, and blue pixel electrodes PEr, PEg, and PEb.

When the red, green, and blue pixel electrodes PEr, PEg, and PEb are directly capacitively coupled to the white pixel electrode PEw, a light is prevented from being blocked by the connection parts RCP, GCP, and BCP and the overlap parts OP1, OP2, and OP3 shown in FIG. 6, and thus the transmittance of the pixel PX is improved.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed. Furthermore, different features of the various embodiments, disclosed or otherwise understood, can be mixed and matched in any manner to produce further embodiments within the scope of the invention.

What is claimed is:

1. A display panel comprising a plurality of pixels, each pixel comprising:
   a plurality of color sub-pixels configured to display different colors from each other; and
   a coupling sub-pixel which overlaps at least one color sub-pixel of the color sub-pixels in plan view so as to be capacitively coupled to the at least one color sub-pixel to be thereby driven so as to display a color different from the colors of the color sub-pixels,
   wherein the plurality of color sub-pixels comprises a first color sub-pixel and a second color sub-pixel, the first color sub-pixel is capacitively coupled to the coupling sub-pixel to form a first capacitance between the first color sub-pixel and the coupling sub-pixel, the second color sub-pixel is capacitively coupled to the coupling sub-pixel to form a second capacitance between the second color sub-pixel and the coupling sub-pixel, and the first capacitance is greater than the second capacitance.

2. The display panel of claim 1, wherein the plurality of color sub-pixels further comprises a third color sub-pixel, the third color sub-pixel is capacitively coupled to the coupling sub-pixel to form a third capacitance between the third color sub-pixel and the coupling sub-pixel, and the third capacitance is smaller than the second capacitance.

3. The display panel of claim 2, wherein the coupling sub-pixel comprises:
   a coupling pixel electrode; and
   a first area in which a first drain electrode of a first pixel transistor of the first color sub-pixel overlaps the coupling pixel electrode is greater than a second area in which a second drain electrode of a second pixel transistor of the second color sub-pixel overlaps the coupling pixel electrode in plan view.

4. The display panel of claim 3, further comprising a third area in which a third drain electrode of a third pixel transistor of the third color sub-pixel overlaps the coupling pixel electrode in plan view, wherein the third area is smaller than the second area.

5. The display panel of claim 2, wherein the first color sub-pixel is a green sub-pixel configured to display a green color and the coupling sub-pixel is a white sub-pixel configured to display a white color.

6. The display panel of claim 5, wherein the second color sub-pixel is a red sub-pixel configured to display a red color and the third color sub-pixel is a blue sub-pixel configured to display a blue color.

7. A display panel comprising:
   a plurality of pixels, each pixel comprising:
   a plurality of color sub-pixels configured to display different colors from each other; and
   a coupling sub-pixel which overlaps at least one color sub-pixel of the color sub-pixels in plan view so as to be capacitively coupled to the at least one color sub-pixel to be thereby driven so as to display a color different from the colors of the color sub-pixels, the coupling sub-pixel including a coupling pixel electrode which is not configured to receive a data voltage directly from a data line,
   wherein the at least one color sub-pixel comprises a color high sub-pixel and a color low sub-pixel configured to display an image having a brightness lower than a brightness of an image displayed by the color high sub-pixel, and the coupling sub-pixel overlaps the color low sub-pixel in plan view, so as to be capacitively coupled to the color low sub-pixel, and
   wherein the color low sub-pixel comprises a first transistor configured to receive a data voltage and a second transistor configured to receive a down voltage to divide the data voltage.

8. The display panel of claim 7, wherein the first transistor comprises a source electrode configured to receive the data voltage, a gate electrode configured to receive a gate signal, and a drain electrode, and wherein the second transistor comprises a drain electrode connected to the drain electrode of the first transistor, a gate electrode configured to receive the gate signal, and a source electrode configured to receive the down voltage.

9. The display panel of claim 8, wherein the at least one color sub-pixel comprises a color pixel electrode, and the drain electrodes of the first and second transistors contact the color pixel electrode, are insulated from the coupling pixel electrode, and overlap at least a portion of the coupling pixel electrode in plan view.

10. The display panel of claim 9, further comprising a common electrode facing the color pixel electrode and the coupling pixel electrode.

* * * * *